US005947689A

United States Patent [19]
Schick

[11] Patent Number: 5,947,689
[45] Date of Patent: Sep. 7, 1999

[54] AUTOMATED, QUANTITATIVE, SYSTEM FOR FILTRATION OF LIQUIDS HAVING A PUMP CONTROLLER

[75] Inventor: Karl G. Schick, Verona, Wis.

[73] Assignee: Scilog, Inc., Verona, Wis.

[21] Appl. No.: 08/852,583

[22] Filed: May 7, 1997

[51] Int. Cl.[6] .............................. F04B 49/00; B01D 61/00
[52] U.S. Cl. ........................... 417/19; 417/44.2; 417/474; 210/195.2
[58] Field of Search .............................. 210/195.2, 195.1; 417/19, 44.2, 44.4, 474

[56] References Cited

U.S. PATENT DOCUMENTS

| | | | |
|---|---|---|---|
| 4,351,731 | 9/1982 | Perrot | 210/647 |
| 4,493,693 | 1/1985 | Bilstad et al. | 604/6 |
| 4,818,384 | 4/1989 | Mayer | 210/195.1 |
| 4,936,980 | 6/1990 | Yoshimichi et al. | 210/647 |
| 5,200,090 | 4/1993 | Ford et al. | 210/195.2 |
| 5,328,574 | 7/1994 | Erickson et al. | 210/195.1 |
| 5,340,290 | 8/1994 | Clemens . | |
| 5,431,811 | 7/1995 | Tusini et al. | 210/195.2 |
| 5,520,816 | 5/1996 | Kuepper | 210/195.2 |
| 5,538,405 | 7/1996 | Patno et al. | 417/474 |
| 5,776,345 | 7/1998 | Truitt et al. | 210/195.2 |
| 5,791,880 | 8/1998 | Wilson | 417/19 |

OTHER PUBLICATIONS

Technical Bulletin: *MidGee™ Cross Flow Filters*, A/G Technology Corporation, 1996.

Operations Manual: *MiniKros Sampler System*, Microgon Inc., 1995.

Technical Bulletin: *The MiniKros® Sampler System*, Spectrum Microgon, May 1996.

Technical Bulletin: *Microgon Techniques for Processing Uniform Latex Particles*, Microgon Inc., 1992.

William F. Blatt, Lita Nelsen, Eliseo M. Zipiliyan, and Mark C. Porter, *Rapid Salt Exchange by Coupled Ultrafiltration and Dialysis in Anisotropic Hollow Fibers*, Separation Science, 7(3) pp. 271–284, 1972.

W.F. Blatt, S.M. Robinson, and Harris J. Bixler, *Membrane Ultrafiltration: The Diafiltration Technique and its Microsolute Exchange and Binding Phenomena*. Analytical Biochemistry, 26, pp. 151–173, 1968.

William F. Bowers and Rudy H. Haschmeyer, *A Versatile Small–Volume Ultrafiltration Cell*. Analytical Biochemistry, 25, pp. 549–556, 1968.

*Primary Examiner*—Ted Kim
*Attorney, Agent, or Firm*—Lockwood, Alex, Fitzgibbon & Cummings

[57] ABSTRACT

A system is provided for proceeding with automated filtration of liquids in a manner which allows for quantitative collection of desired filtrates or permeates. The system, as well as its associated method, monitors various parameters which are fed to a processor-controlled pump unit. This pump unit has several alternative modes of operation, including controlling the rate of flow through the pump unit. Data are received from one or more pressure sensors and preferably also from a scale. The processor-controlled pump unit operates on these data to control flow velocity and/or filter back pressure within the system.

45 Claims, 6 Drawing Sheets

AUTOMATED, QUANTITATIVE, SYSTEM FOR FILTRATION OF LIQUIDS HAVING A PUMP CONTROLLER

BACKGROUND AND DESCRIPTION OF THE INVENTION

The invention generally relates to the filtration of liquids, more particularly to high precision separation suitable for use in the pharmaceutical and biotechnology industries. The invention is especially applicable to filtration through a porous membrane sheet or a porous hollow fiber column. With the invention, a variety of separation techniques are handled in a quantitative manner and can be automated, including having the separation proceed until a desired level of purity or other characteristic or parameter is attained. The invention automates separation processes such as microfiltration, microparticle coating and washing, ultrafiltration, diafiltration and certain preparative chromatography applications. It also automates and optimizes viral infection of mammalian cells such as in gene therapy research and development, as well as rapid cell separation, protein clarification and protein concentration.

In the pharmaceutical and biotechnology industries, the use of micro-filtration, ultrafiltration, tangential or cross-flow filtration, as well as constant volume diafiltration are well-established methods for the separation of dissolved molecules and/or suspended particulates. Typically, the liquid to be filtered is forced through a porous membrane sheet or a porous hollow fiber column. Such sheets or membranes are commercially available in different pore sizes. Depending upon the selected pore size, molecules or particulates smaller than the average membrane or column pore size will pass, together with solvent for example, through the membrane or hollow fiber walls. These molecules or particulates are collected as filtrate, while the retentate is left behind. Many filtration approaches, such as those incorporating ultrafiltration or tangential-flow filtration devices, the retentate is repeatedly re-circulated with the objective of improving filtration efficiency and enhancing the yield of the filtrate or permeate.

However, filtration devices tend to clog when used over an extended period of time and must be timely replaced. Clogging of a filtration device occurs when the membrane pores become obstructed, typically with trapped cells, particulate matter, cell debris or the like. This clogging of the pores results in a decreased liquid flow across the porous membrane sheet or hollow fiber column wall. The result is the development of a back pressure increase which, if not properly addressed, runs the risk of serious detriment to the operation which incorporates the filtration procedure.

Attempts to address these concerns and difficulties have included the development and use of semi-automated filtration systems. These types of systems utilized either manually controlled recirculation pumps or pumps which are controlled by a timing device which will stop pump action after a preset filtration time has elapsed. It is also typical to monitor back pressure through the use of an analog or a digital pressure gauge, usually located between the pump and the filter device. When the gauge reads a certain back pressure level, typically one specified by the manufacture of the filter device, the filtration must be stopped and the old filter must be replaced with a new one. At times, it is not possible to accurately predict the time at which the pumping action must be stopped in order to avoid overtaxing the filter device. Accordingly, prior art systems which rely solely on timing are not entirely satisfactory.

Prior art filtration technology such as that referred to above also is disadvantageous because it is typically very labor intensive. This prior technology also has additional, serious shortcomings for safe and efficient operation. One shortcoming is that the filtrate yield is frequently not quantitative because of unpredictable solution particulate loads. Thus, for a given re-circulation volume and pump rate, the filtrate yield may differ from case to case, depending upon the amount of pore-sized particulate suspended in the recirculation solution. Another shortcoming is a direct result of back pressure build up due to clogging. Rapid back pressure build up at times causes bursting of the filter membrane and/or the filter housing, resulting in costly spillage and/or filtrate contamination. Excessive filter back pressure also frequently leads to blow-off of tube connections such as at the filter inlet, resulting in costly spillage of retentate, for example. Because of these types of shortcomings, manual and semi-automated filtration systems need to be constantly monitored, which greatly contributes to the high labor intensity of such approaches.

Accordingly, there is a need for filtration arrangements which provide for quantitative capability with back pressure monitoring. Desirably, such a filtration approach allows for rapid and safe filtration without concern of losing product, particularly pharmaceutical products or biotechnology products which can be extremely expensive, difficult to replace, and can represent the investment of many hours of prior processing. It would be advantageous to provide systems or procedures which are useful in preventing costly spills. It would also be desirable to provide a filtration approach which can coax the maximum life out of a filtration device without running the risk of generating operational conditions which can lead to excessive back pressure build up near the end of the life of the filtration device.

It has been found that, by proceeding in accordance with the present invention, it is possible to achieve quantitative filtration of liquids in an automated, labor unintensive manner, all while enhancing the safety of the operation while virtually eliminating spillage risks due to overextending the capabilities of the filtration device for handling the particular liquid being filtered and the particular parameters of the filtration system.

SUMMARY OF THE INVENTION

In summary, the present invention is characterized by the achievement of automated, quantitative filtration of liquids. The system includes a reservoir which contains the liquid to be filtered, typically including valuable pharmaceutical or biotechnological material which needs to be separated from a liquid component, such as carrier, a reaction solution, or other liquid component which are in need of separation in accordance with precise filtration techniques. A conduit system directs this liquid into a filtration unit through the action of a processor-controlled pump unit. At least one pressure sensor is positioned along the conduit system. The processor-controlled pump unit controls the rate at which the liquid moves through the filtration unit in accordance with settings made for the particular liquid being filtered. In an especially advantageous embodiment, the liquid flow rate is varied in accordance with pressure sensor data. The processor-controlled pump unit also has the capacity to cease and/or vary flow parameters so as to control them and/or indicate that filtration parameters and/or goals have been achieved.

It is a general object of the present invention to provide an improved automated, quantitative liquid filtration apparatus and method suitable for precisely handling filtration of pharmaceutical and/or biotechnology materials.

Another object of the present invention is to provide an improved apparatus and method for exacting filtration of liquids which monitor back pressure build up and automatically control liquid flow to the filter unit without concern of component or product spillage due to bursting or blow-off of components of the system and the resulting leakage out of an otherwise closed system.

Another object of this invention is to provide an improved apparatus and method for the filtration of liquids which vary liquid flow in accordance with a varying level of resistance to flow which develops within the system, particularly the filtration unit.

Another object of the present invention is to provide an improved liquid filtration system and method which are automated and need not be constantly monitored by an operator, thereby being characterized as having very low labor intensity.

Another object of the present invention is to provide an improved filtration which includes the use of one or more alarm channels in order to inform the user that a particular condition had been attained or in order to stop the system when a particular condition had been attained, or both.

These and other objects, features and advantages of the present invention will be clearly understood through a consideration of the following detailed description.

BRIEF DESCRIPTION OF THE DRAWINGS

In the course of this description, reference will be made to the attached drawings, wherein:

FIG. 2 is a view similar to FIG. 1 which is particularly appropriate for diafiltration and the like;

DESCRIPTION OF THE PARTICULAR EMBODIMENTS

Figure 1:
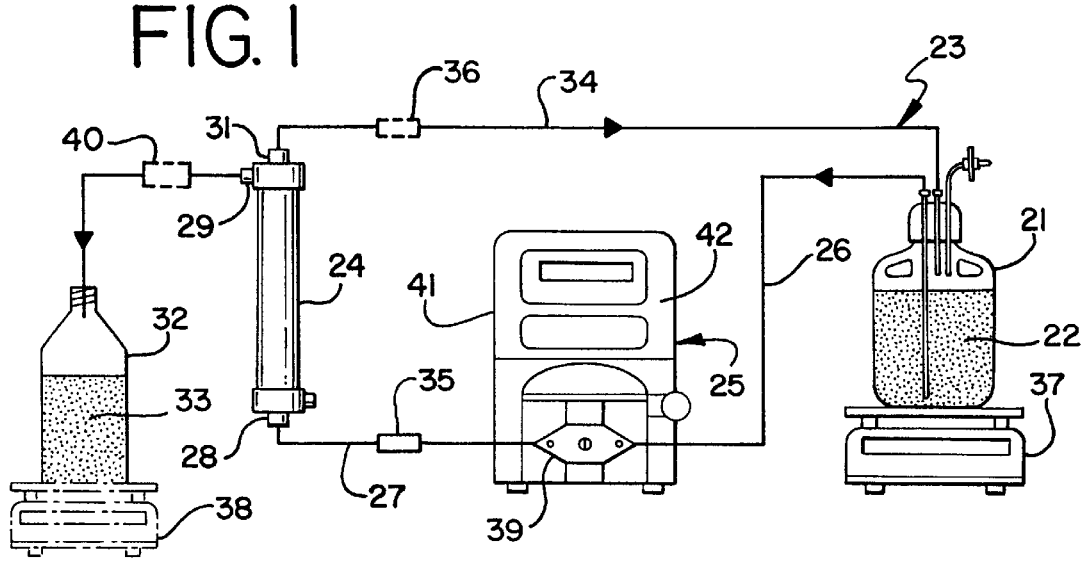
FIG. 1 is a somewhat schematic illustration of an apparatus of the type discussed herein which is especially suitable for ultrafiltration types of applications.

A system particularly designed for ultrafiltration, microfiltration and the like is illustrated in FIG. 1. A reservoir 21 for containing a liquid to be filtered 22 is shown in liquid-passing communication with a conduit system, generally designated at 23. A filtration unit 24 is also positioned along the conduit system, as is a processor-controlled pump unit 25.

In this illustrated arrangement, the conduit system 23 includes various lengths of conduit or tubing, such as a conduit length 26 by which liquid 22 passes out of the reservoir 21 by the action of the pump unit 25 on the conduit. In a typical application, the conduit system is comprised primarily of scientific or medical tubing which is acted upon by peristaltic components of the pump unit 25. This conduit length 26 opens into a conduit length 27 to complete passage of the liquid 22 from the reservoir to the filtration unit 24. Tubing includes PharMed and Masterflex® silicone pump tubing.

With more particular reference to the filtration unit 24, this includes an inlet 28, a filtrate outlet 29, and a retentate outlet 31. A collector 31 is preferably provided for collecting the filtrate (or permeate) 33 which, by operation of the filtration unit, is separated from the liquid 22 and flows out of the filtrate outlet 25. Retentate which flows out of the retentate outlet 31 is returned to the reservoir by a recycle component 34 of the conduit system 23.

Filtration unit 24 often will take the form of an ultrafiltration column of a type which is presently available. Other filtration units can be used, including those characterized as tangential or cross-flow filtration devices. The filter units may be of the type wherein the liquid to be filtered encounters a porous membrane. The filter unit may be of the type which incorporates porous hollow fibers, and the flow of liquid is of a generally tangential type or cross-flow type. These filtration units are of types which are generally known. They have a variety of pore sizes which are selected to achieve the desired separation action. Commercially available filtration units include those which are stacked plate and spiral devices which use flat sheet membranes. Others include tubular devices, as well as shell and tube devices which use hollow fiber membranes. Cross-flow or tangential ultrafiltration, diafiltration or dialysis filter units operate on the principle of providing high fluid flow velocity parallel to the membrane surface. Tangential ultrafiltration generally operates best at high velocity flow rates.

Proper functioning of these filtration units is severely hampered as permeate or filtrate builds up on the membrane inside wall. This can result in the development of a so-called gel layer of solids and/or macromolecules. This buildup gradually and persistently decreases the filtration efficiency and capacity of the filter unit. If proper measures are not taken, such as those in accordance with the invention, back pressure will continue to build up. If left unchecked, this increasing back pressure will eventually cause failure and/or leakage in the closed system. Typically, back pressure induced failure will be evident in the filter unit and/or in the conduit system. For example, the filter unit and tubing of the conduit system can fail due to excessive internally applied pressure. Alternatively or additionally, seals between the conduit system and other components of the apparatus can fail, and/or the tubing can be blown off of a seat or connection point. Such events will lead to loss of valuable components and potential contamination of the theretofore closed system.

The system illustrated in FIG. 1 further includes at least one pressure sensor 35 within the conduit system. A second pressure sensor 36 and a third pressure sensor 40 are also shown installed along the conduit system. In tangential flow filtration, the driving force (trans-membrane pressure $P_T$) is the difference between the average of the membrane feed pressure ($P_F$) and the retentate pressure($P_R$) minus the permeate pressure ($P_P$).

$$P_T = (P_F + P_R)/2 - P_p \qquad (1)$$

In many tangential flow applications, the retentate pressure ($P_R$) is kept at atmospheric pressure, i.e. $P_R=0$, therefore:

$$P_T = (P_F/2) - P_p \qquad (2)$$

Figure 2:
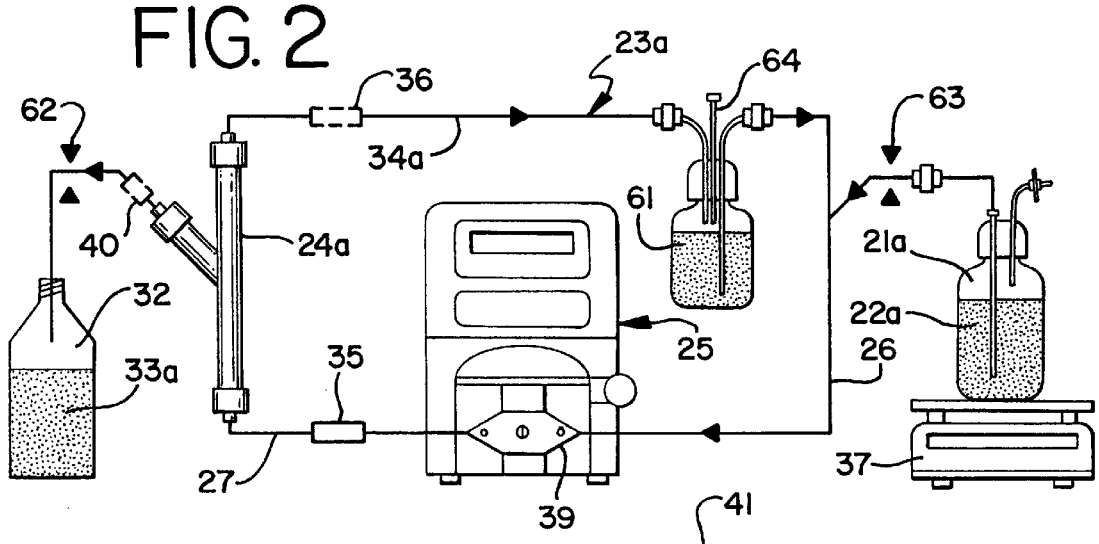

Quite frequently the permeate/filtrate pressure ($P_p$) is also kept at atmospheric pressure, i.e. $P_p=0$, therefore:

$$P_T = a\, P_F \qquad (3)$$

wherein "a" is a constant or proportionality factor. Thus in tangential flow applications where the pump feed pressure ($P_F$), the retentate pressure ($P_R$) and the permeate pressure ($P_p$) are all allowed to change, equation (1) defines the trans membrane pressure ($P_T$) and three pressure measurements/sensors are required. FIGS. 1 and 2 show typical relative locations of these three pressure measurement points, such being at pressure sensors 35, 36, 40 within the conduit system. This would be useful when it is important to control outflow from the filtration unit, such as with a clamp, valve, pump or the like. Alternatively, appropriate differential pressure measurements can be made.

Equation (2) defines the trans-membrane pressure ($P_T$) when the retentate pressure ($P_R$) is at atmospheric pressure. In this configuration, two pressure measurements are, or one differential pressure measurement/sensor is required. Equation (3) defines the trans-membrane pressure ($P_T$) when both retentate ($P_R$) and permeate($P_p$) pressures are at atmospheric levels. In this situation, typically only pressure sensor 35 is utilized.

Preferably, each pressure sensor is an electronic pressure sensor which detects pressure within the conduit system at its particular location. Means are also provided for transmitting pressure data from each pressure sensor to the processor-controlled pump unit 25. In this manner, the processor-controlled pump unit 25 has virtually instantaneous access to this pressure data. Suitable in-line, electronic liquid pressure sensors are generally known and are available. An example is Micro Switch 26PC Series Flow-Through pressure sensor, available from Honeywell Inc. Often, such a pressure sensor is electronically connected to a preamplifier, which in turn is mounted to an in-out port on the processor-controlled pump unit 25.

It is often desirable to input weight data to the processor-controlled pump unit. FIG. 1 illustrates an electronic top-loading balance 37 positioned and adjusted for measuring the weight of the liquid 22 within the reservoir 21. These weight data are electronically transferred to the processor-control pump unit 25. When it is desired to measure or weigh the filtrate or permeate which is collected within the collector 32, means are so provided. With the arrangement using balance 37 as illustrated in FIG. 1, this can be reasonably well accomplished by measuring the decrease in the weight of the liquid within the reservoir 21. Alternatively or additionally, a balance 38 (shown in phantom) can be positioned for directly measuring the weight of the filtrate or permeate 33. Generally speaking, the use of the balance 38 allows for enhanced quantitative measurement of the filtrate or permeate. It will be appreciated that the somewhat indirect measurement by monitoring the decrease in the liquid 22 in the reservoir 21 must take into account liquid remaining within the conduit system and the filtration unit, which amounts are not necessarily totally consistent throughout the processing procedure.

Various electronic balances can be used. These include the following electronic top-loading balances: Mettler® PM Series, Sartorius® MC1 Series and Ohaus® GT Series.

Referring more particularly to the processor-controlled pump unit 25, the illustrated device includes a peristaltic pump head 39. Preferably, the pump head is of a two-channel variety. Especially preferred is a Tandem (Trademark) peristaltic pump head available from Scilog, Inc., Madison, Wis. Two-channel peristaltic pump heads in this regard are described in U.S. Pat. No. 5,340,290, incorporated by reference hereinto. Whatever type of pump unit is used, it is important that it be exceptionally accurate so as to impart a precise flow rate to the liquid in accordance with instructions received from the processor component of the processor-controlled pump unit 25. For example, the Tandem pump can accurately move from between about 2 ml/min to about 2200 ml/min per channel.

Figure 3:
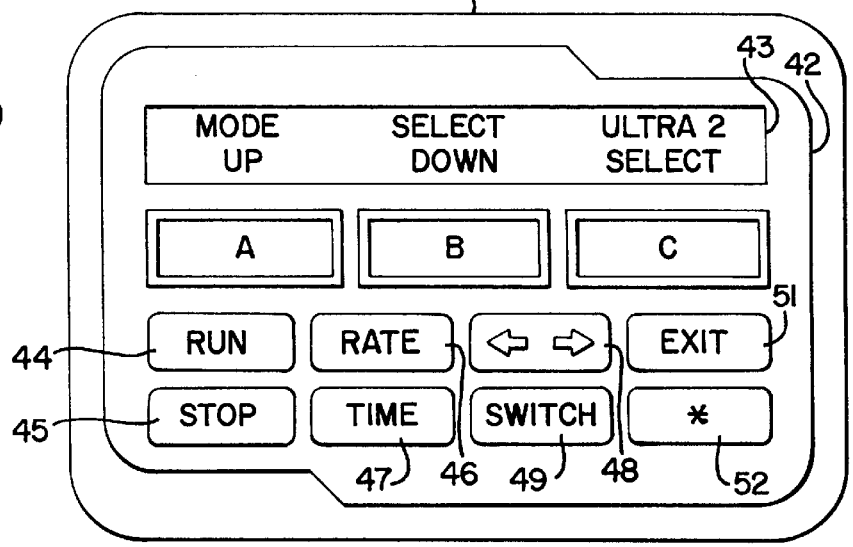
FIG. 3 is an enlarged, detail view of the control and display panel which is generally shown in FIGS. 1 and 2.

The processor-controlled pump unit 25 includes a processor component 41. A control and display panel 42 provides the interface between the user and the processor 41. Included is a display 43 and a series of operator activated controls (FIG. 3). These controls allow the operator to input parameters and instructions in accordance with the particular needs of the liquid being subjected to the separation capabilities of the filtration system. The illustrated front panel user interface includes an alphanumeric liquid crystal display (LCD) and a membrane keypad to select operational modes and alarm settings.

The lower line on the illustrated LCD 43 is used to signify the function of the "soft keys" marked "A", "B" and "C". The "soft key" current labels are displayed in the lower line of the LCD. Pressing each key performs the function displayed above it. For example, with the illustrated display at 43, pressing the "A" key will scroll up.

FIG. 3 shows a main keypad which consists of eight "hard" keys whose function does not change. These keys are used for basic control and programming. A RUN control key 44 executes the selected operational mode and starts the pump 39. A STOP control key 45 interrupts current operational mode and stops the pump. A RATE control key 46 sets the pump rate in ml/min. A TIME control key 47 displays motor pulses per second. A double arrowhead control key 48 orders clockwise or counterclockwise pump direction. A SWITCH control key 49 and an EXIT control key 51 are provided. A STAR (*) control key 52 is used in pump rate recalibration.

Figure 6:
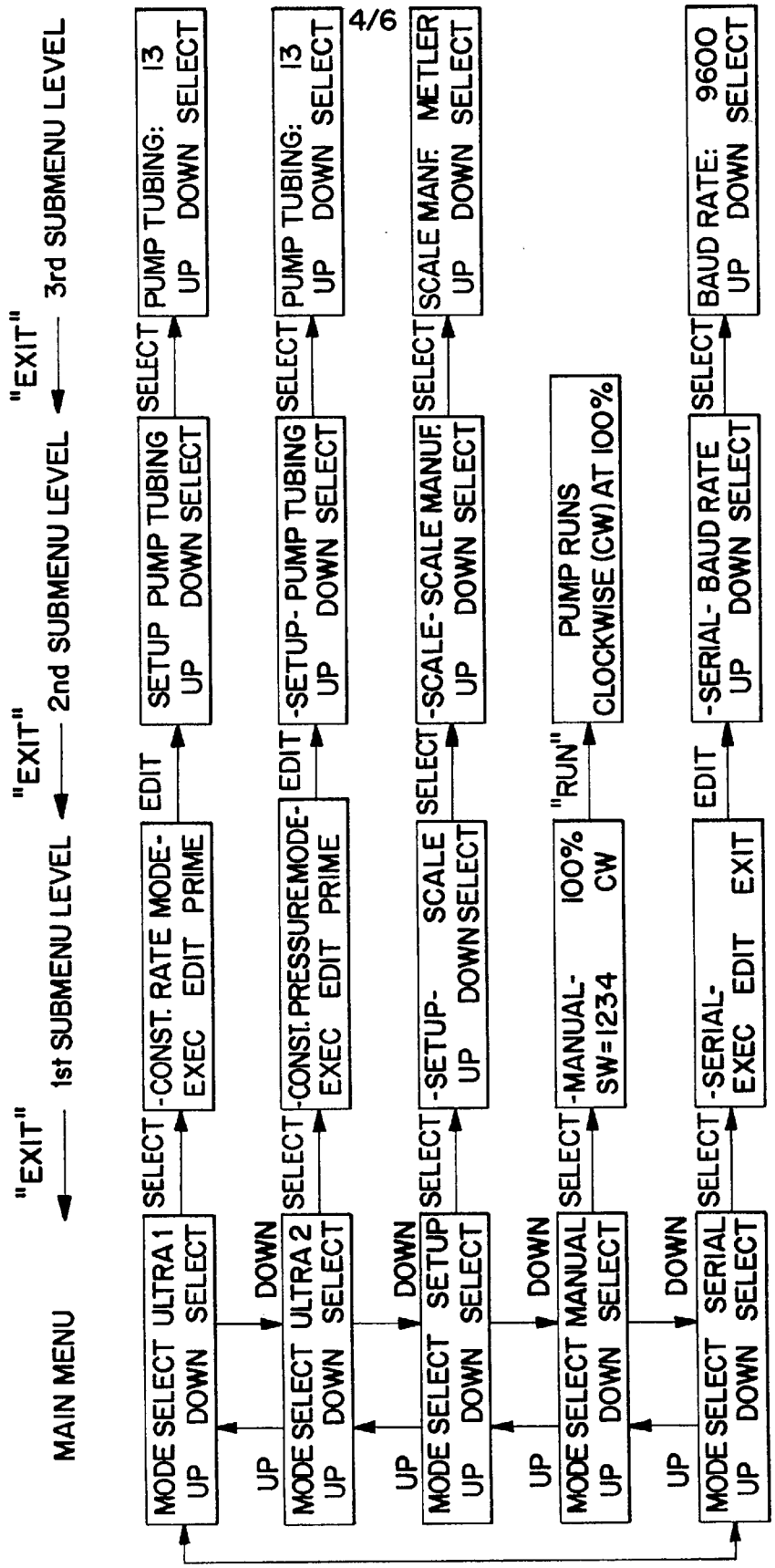
FIG. 6 schematically provides an overview of software suitable for use in the processor-controlled pump unit.

FIG. 6 shows a preferred main menu for the control data channel circuitry, which consists of five operational modes. "Up" and "Down" keys are used to scroll through the main menu. Pressing a "Select" key enters a chosen operational mode, e.g. ULTRA 1, and enters the first submenu level which provides access to the "Exec" and "Edit" functions. In the "Edit" submode, the pump parameters are selected for filter application. Pressing "Exit" returns to the main menu.

Figure 4:
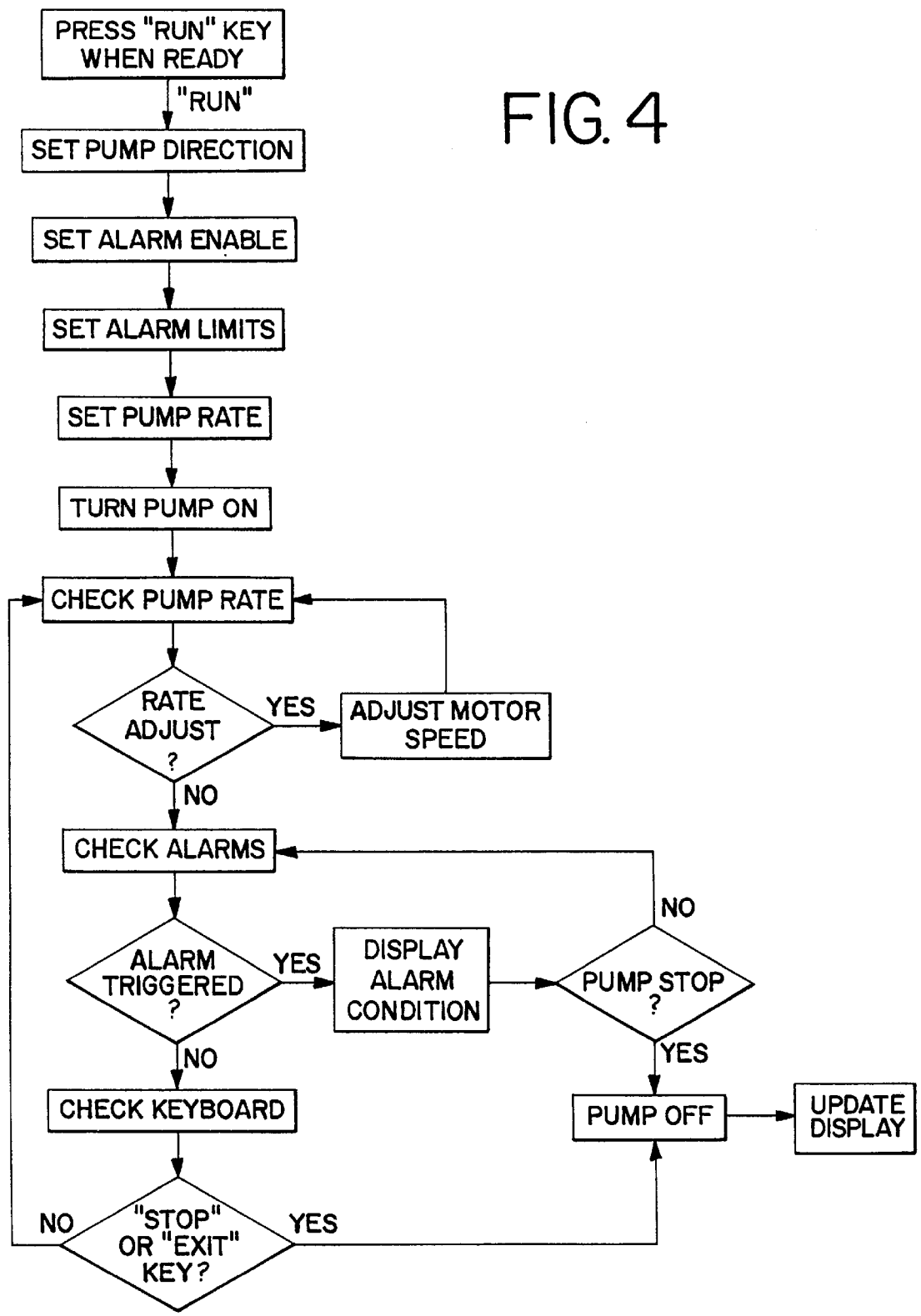
FIG. 4 is a schematic data flow chart associated with a constant rate filtration application.
Figure 7:
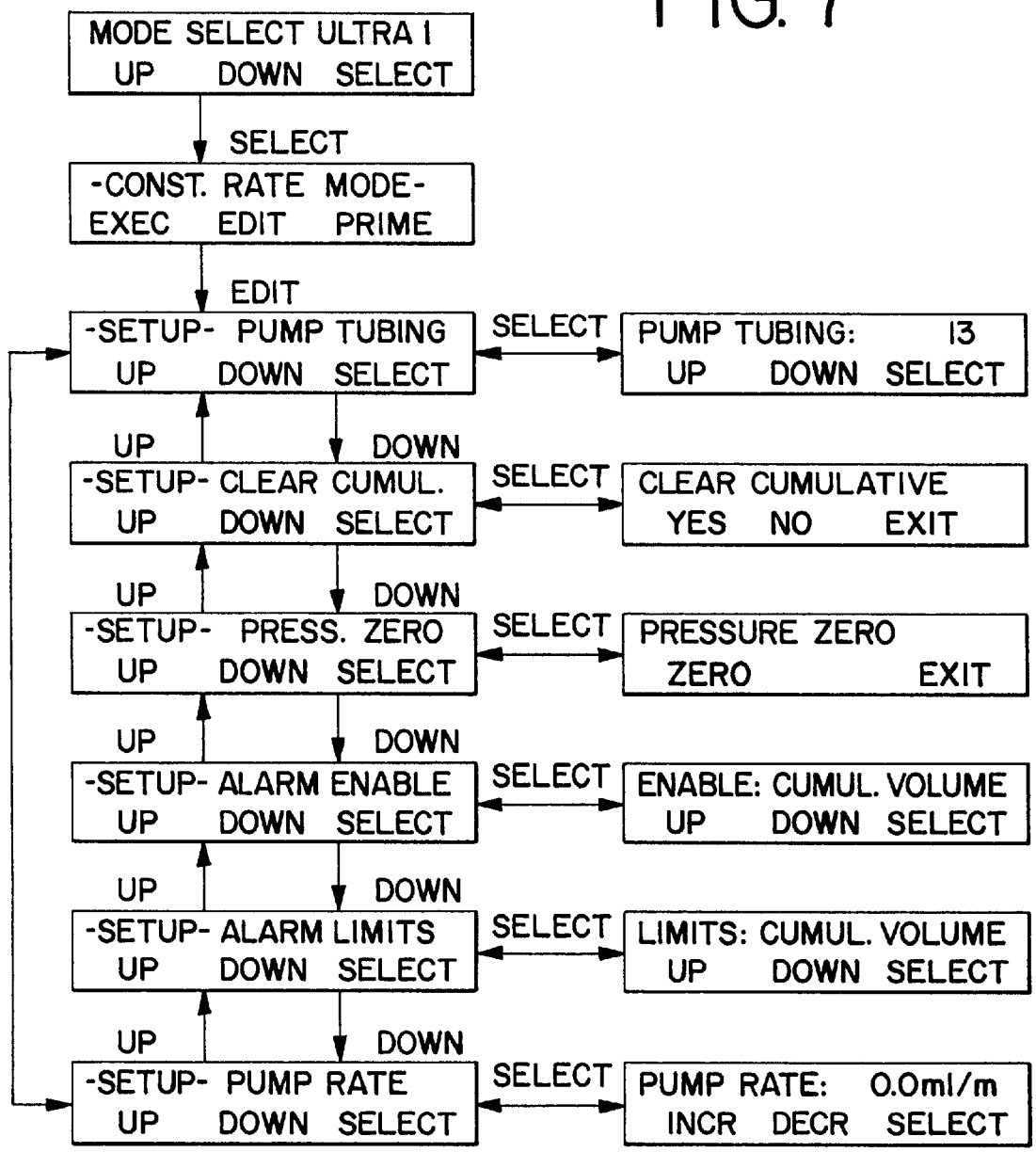
FIG. 7 schematically describes edit details of the constant rate filtration mode.

The ULTRA 1 operation mode implements constant pump rate filtration, i.e. that of FIGS. 4 and 7. A user-selected pump rate (filtration feed rate) is maintained during filtration when the system is in this mode. In the "Edit" submode the pump tubing is selected, and the factory installed calibration tables which relate the pump output in ml/min to pump motor speed are selected. Pump rate in terms of ml/min are selected. Five user-programmable alarm parameters can be selected: Cumulative (Retentate) Volume; Run (Pump) Time; Low Pressure (Low Filter Back Pressure); High Pressure (High Filter Back Pressure); Filtrate (or Permeate) Weight Alarm.

Figure 5:
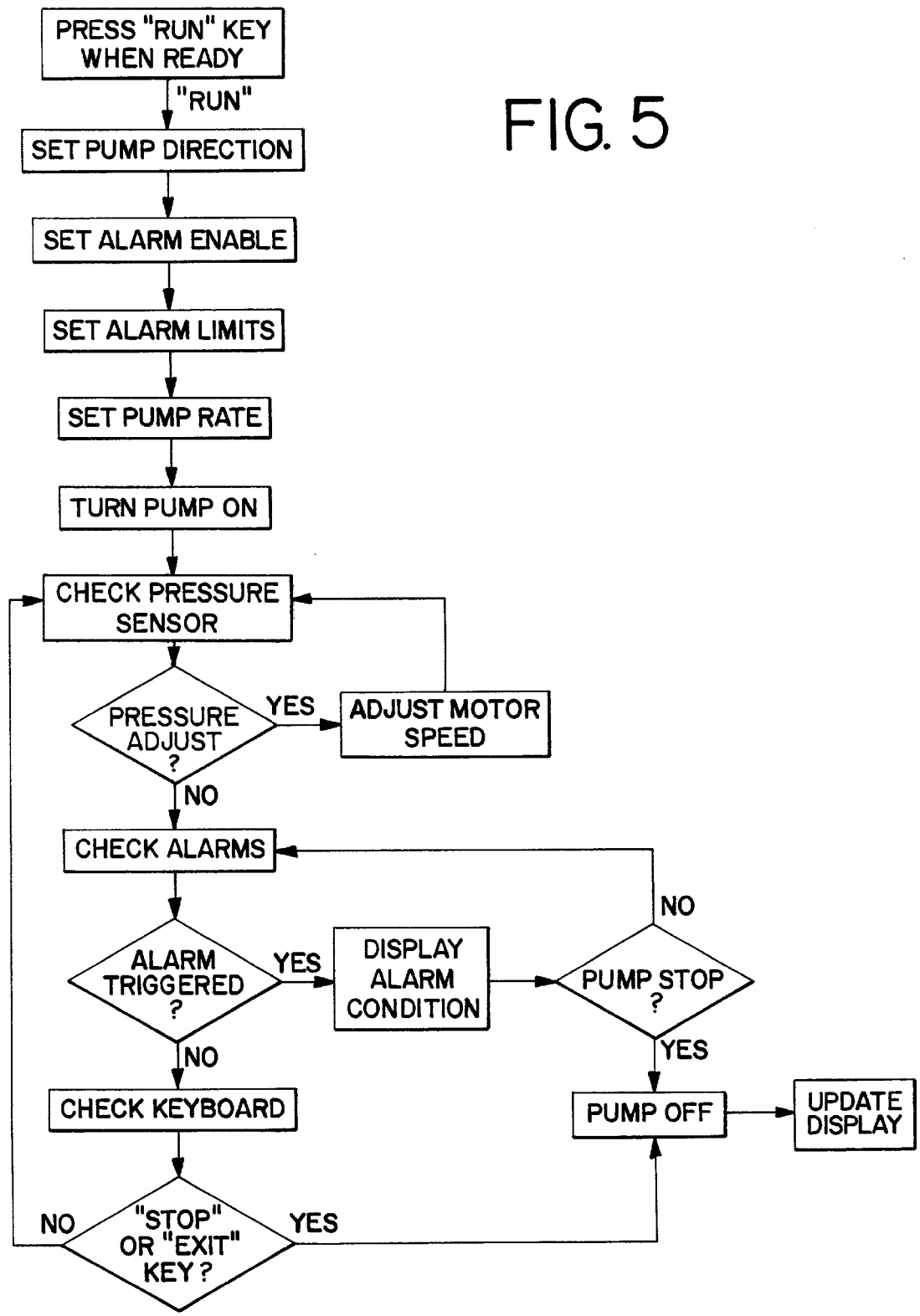
FIG. 5 is a schematic data flow chart associated with a system for maintaining filtration under constant pressure conditions.
Figure 8:
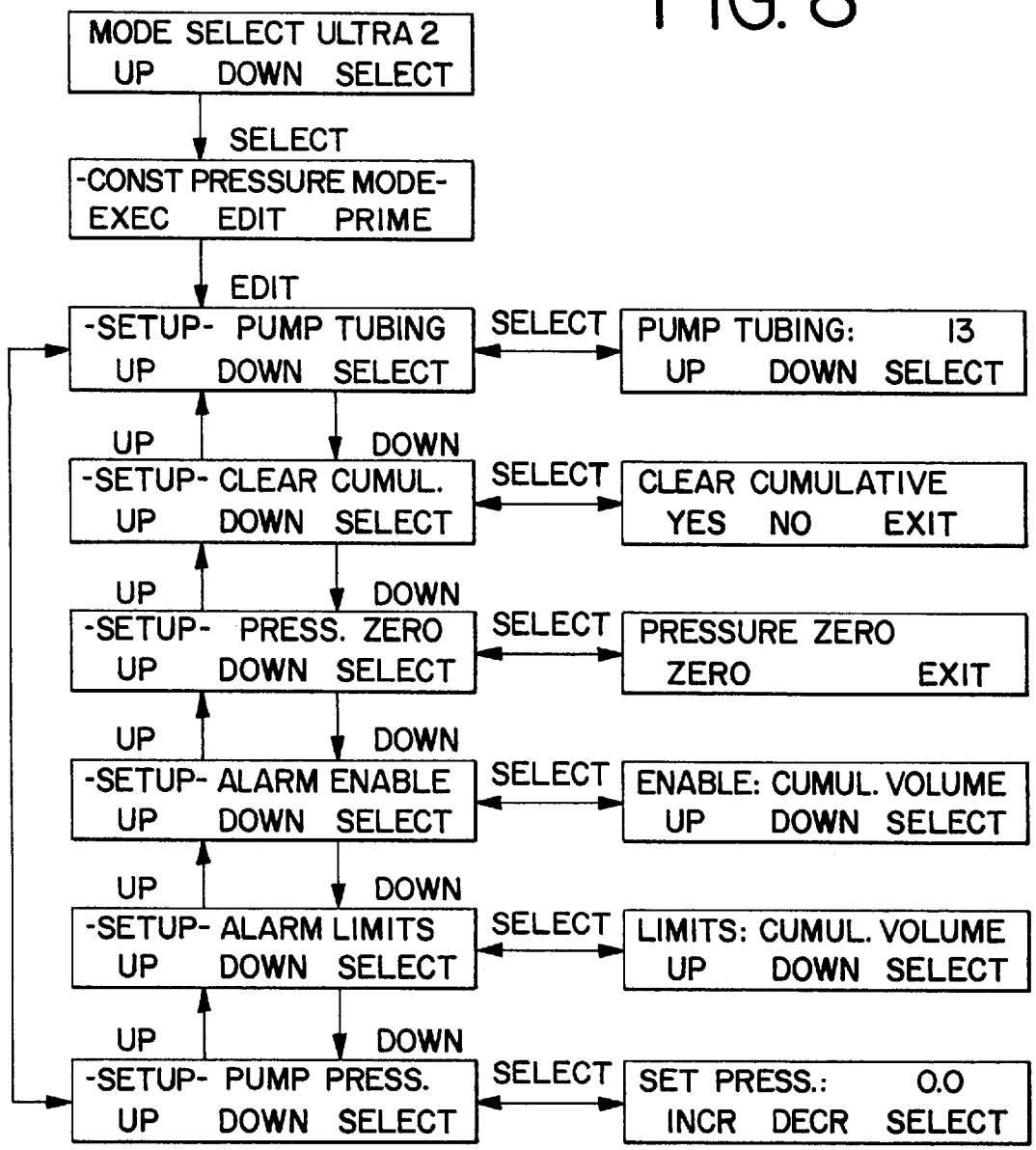
FIG. 8 schematically describes edit details of the constant pressure filtration mode.

The ULTRA 2 operation mode implements constant pressure filtration, i.e. that of FIGS. 5 and 8. A user-selected filter back pressure is maintained by modulating the pump output when the system is in this mode. When the filtration device starts to plug up, the processor will maintain the selected filter back pressure by automatically decreasing the pump rate. The filter back pressure setting, Pump Pressure, is selected in the "Edit" submode. This setting allows the user to choose a safe back pressure that also is consistent with a desired filtrate/permeate flow rate. Also, the alarm parameters are selected as in the ULTRA 1 mode.

The SETUP operation mode allows the user to select various user preferences and interface options. The Setup: Scale submode provides electronic balance options. The Setup: System Test submode allows check-out of outputs. Setup: Printer is used for setting up the printer communications parameters, while Setup: Pump allows the user to set various pump user preferences. Setup: Serial defines the communications parameters of the SERIAL mode. MANUAL allows manual pump sped control, and SERIAL allows remote control of the pump.

A typical operation of the filtration system as illustrated in FIG. 1 will now be described, with reference being made to the data flow schematic of FIG. 4. This arrangement illustrates constant rate ultrafiltration. The filter back pressure as well as the filtrate weight are continuously monitored. When a pre-set back pressure limit is exceeded, the processor-controlled pump unit will stop pumping and/or provide an alarm signal. The RUN control key 44 is depressed in order to activate the processor component 41.

An optical encoder and associated circuitry are preferably provided to count and control the pump motor rotations necessary to implement a selected pump rate. The illustrated processor component 41 incorporates a microprocessor-based controller, and a battery-backed EPROM stores the filtration control software. The software includes a calibration table which relates the pump motor rate (RPM) value with the pump output in terms of ml/min. A preferred calibration table includes the following data:

| Masterflex Tubing Sizes: | 13 | 14 | 16 | 25 | 17 | 18 |
|---|---|---|---|---|---|---|
| Tube Inside Diameter: inches (mm) | 0.03 (0.8) | 0.06 (1.6) | 0.12 (3.1) | 0.19 (4.8) | 0.25 (6.4) | 0.31 (7.9) |
| Pump Rate Range: ml/min. | | | | | | |
| Min. | 1 | 3.2 | 14 | 32 | 46 | 60 |
| Max. | 34 | 118 | 446 | 930 | 1500 | 2200 |

These data ensure an accurate volume per number of pump motor turns for a particular tube size. Thus, the operator selects the pump tubing by number (e.g. in accordance with standard pump tubing values in the table or other ones such as Nos. 24, 18, 17, 16, 15, 14 and 13) by activating RATE control key 46 and then selecting the desired rate within the table values for the tubing size.

Processor component 41 contains a permanent, factory installed calibration table for each of the six pump tube sizes listed above. The calibration table relates the pump motor RPM to the pump output in terms of ml/min. Differences in pump tube formulation/manufacture, as well as pump tube wear over time may cause the pump output to change. For recalibration, the user first selects the pump tube size (while in the EDIT mode), and then selects pump rate and dispenses water at 2–4 times of that volume. The user adjusts the average volume parameters to the volume of water dispensed and presses Select to update the calibration table.

In the illustrated embodiment, five different alarm parameters are programmable by the operator by operation of the control data channel circuitry and/or its limit-setting data channel circuitry. These user-selected alarm parameters include a high pressure alarm limit to monitor plug-up conditions of the filtration device, typically associated with the pressure sensor 35. A low pressure alarm limit is also programmable in order to monitor sudden lowering of pressure within the system, such as when tube connections have failed and the process solution possibly is being lost. This function can be responsive to data received from either or both of pressure sensors 35, 36.

A filtrate weight alarm limit also can be set in order to quantitatively monitor the amount of solution collected in the collector 32. When the filtrate weight is directly measured, such as when the balance 38 is included, a stop and/or alarm function will proceed when that limit amount is attained. When the filtrate weight is to be indirectly monitored by virtue of weight data obtained from electronic top loading balance 37, the filtrate yield is calculated by the software based upon the weight differential of the liquid in the reservoir 21 at time =0 (start of filtration) and at some later time, for example after 30 minutes. The operator can also set a run time alarm to stop or signal when a user-defined filtration time has elapsed. A retentate volume alarm limit can also be set in order to monitor the solution volume which is pumped by the pump head 39.

For any of these alarm parameters, the operator can select one of three options: Alarm Off, Signal Only or Pump Stop. The latter can be combined with emitting a signal as well. The signal can be audible, vibrational and/or visible. All of the options except for Alarm Off are implemented when the operator-defined alarm limits are exceeded. For example, when the high pressure limit is set at 10.0 psi, the processor-controlled pump unit 25 will stop and/or provide an alarm signal when the filter back pressure, typically as measured at the pressure sensor 35, exceeds 10.0 psi.

With further reference to the constant rate filtration option of FIG. 4, editing details are shown in FIG. 7. Pressing the "Up" and "Down" keys makes a selection, and "Select" is pressed to implement that selection. The Cumulative Volume alarm setting represents the total volume of process solution (retentate) that is pumped through the filtration device. This defines permeate yield in terms of the amount of retentate recirculated through the filtration system. A run time alarm setting sets a timer for the filtration of the process solution. This defines the processing time, i.e. the time required to obtain a desired permeate yield. A Lo-Pressure alarm is triggered when a sudden filter back pressure drop occurs. Such a change in the filter back pressure usually indicates a system leak, e.g. pump tubing has slipped off the filter connection. The Hi-Pressure setting specifies an upper pressure limit. The Filtrate Wgt setting can be used to implement the filtrate/permeate weight alarm. The filtrate/permeate weight (grams) to be collected is set.

Appropriate software and hardware are provided in a conventional manner in order to permit a printout by way of a printer (not shown) of desired parameters. Typical parameters thus reported are elapsed filtration time in minutes, collected filtrate weight in grams, retentate volume in milliliters, pump back pressure in psi, as well as pump status changes and alarms as they occur.

For example, when an aqueous solution having a relatively low particulate load is to be filter-sterilized, the following describes typical parameters which the operator can program into the processor-controlled pump unit in order to provide high operational safety and optimal filtration conditions in accordance with this illustrated arrangement. They are: pump tubing, No. 18; pump rate, 2000 ml/min; filtrate weight alarm limit, 10,000 gms for pump stop; high pressure alarm limit, 15 psi for pump stop; low pressure alarm limit, 10 psi for pump stop; run time alarm limit, 45 min for off; and retentate volume alarm limit, 100 liters, signal only.

With this set up, the processor-controlled pump unit will stop when the filtrate weight reaches 10,000 grams or the back pressure exceeds 15 psi. Should the back pressure drop below 10 psi, the pump also will stop. The run time alarm is turned off, thus indicating that the time parameter is not an important factor, and an alarm signal will occur only when the desired retentate volume is collected in the collector 32. The pump will generate a pump rate of 2000 ml/min until the pressure alarm limits are triggered or the desired filtrate weight is reached.

In this particular arrangement, the filtration unit 24 includes a filtration membrane having 0.2 micrometer pores. The filter back pressure during the run will typically be approximately 13 psi, which is sufficient to force a large percentage of the process solution through the filtration membrane. The remaining retentate volume in the solution reservoir becomes smaller and smaller over time, until 90% or more of the initial process solution has been collected as sterile filtrate. Should the back pressure exceed the set alarm limit in this example, and if the desired filtrate weight has not as yet been attained, the operator should shut down the processor-control pump unit by pressing the STOP control key 45. Then, a fresh filtration unit 24 can be installed in order to complete the desired collection and without danger of spillage of the valuable filtrate because excessive back pressure has caused a failure within the filtration system. Throughout the procedure, relevant parameters are available to the operator by viewing the display 43.

FIG. 5 illustrates the ability of the filtration system of the invention to achieve constant pressure filtration. In this instance, the pressure data, typically the high pressure data, are continuously fed back to the processor component 41. Once the filter back pressure reaches a desired maximum level, the pumping rate is decreased so that the pressure will not exceed the set back pressure level, but the pumping will continue. This feedback arrangement continues, typically with the pumping speed gradually decreasing until the filtration objective is attained. This allows the maximum life and efficiency to be attained from the filtration unit 24 without running any risk of exceeding a safe back pressure limit and thus avoiding the risk of spillage or the like. The alarm arrangements can also be implemented as discussed elsewhere herein. FIG. 8 shows a typical EDIT mode for the constant pressure filtration mode.

This constant pressure filtration application automatically decreases the pump rate when an increase in filter back pressure, such as due to gradual plugging up of the filter by residue left on the filter membrane or fiber, is detected. The constant pressure mode prevents the unsafe buildup of filter back pressure while, at the same time, automating and optimizing the filtration process. An optical encoder and associated circuitry count and control the pump motor rotations necessary to implement a set pump rate for the particular pump tubing size which is used. Based upon the selected parameters, the processor-controlled pump unit 25 automatically ramps up the pump rate until the selected filter back pressure has been attained. This back pressure is maintained by modulating (either increasing or decreasing) the pump rate. When the filtration device starts to plug up, because of the build up of a gel layer or build up of particulate matter within the filter channels, the selected filter back pressure is maintained through a decrease in pump rate. The processor component automatically senses the filter back pressure change and compensates for this change by decreasing the pump rate. This continues until a user-selected low flow alarm limit has been reached, or after the desired volume or weight of filtrate or permeate has been collected, at which time the system automatically shuts off. The result is optimized and extended filter capacity and enhanced operational usefulness of the filtration device, while still provided a high level of operational safety.

With reference to FIG. 2, a filtration system similar to FIG. 1 is illustrated. This particular system is especially suitable for achieving automated diafiltration. A diafiltration container 61 is incorporated into the conduit system 23a at a location downstream of the filtration unit 24a. Permeate 33a is collected within the collector 32, and retentate exits the filtration unit 24a for passage through the diafiltration container 61. Clamps 62 and 63 are also provided as indicated. The reservoir is an exchange buffer reservoir 21a.

Diafiltration is particularly useful for clean-up steps in pharmaceutical and biotechnology applications whereby dissolved salts and other low molecular weight substances need to be removed from these dilute protein solutions. This removal of undesirable substances is accomplished through a simultaneous exchange with an appropriate buffer solution. Typically, this is followed by a second step in which the concentration of the dissolved protein is significantly increased through a partial removal of the buffer solution. The present invention is particularly useful in accomplishing these tasks in a constant volume diafiltration procedure.

With more particular reference to FIG. 2 in the context of a constant volume diafiltration in connection with a procedure for deriving valuable enzymes or proteins from mammalian or bacterial cell lines which are typically grown in carefully monitored bioreactors or fermenters, particularly with reference to the clean-up steps of such procedures, the following general approach is used. During constant volume diafiltration, soluble components, particularly dissolved salts and other low-molecular weight contaminants, freely pass through the filter membrane as permeates, while the larger molecular weight enzymes or proteins do not pass through and are the retentate.

Diafiltration is accomplished by adding exchange buffer at the same rate as the permeation rate. The amount of diafiltration performed can be expressed by the amount of exchange buffer added, divided by the initial process volume, that is the number of "wash volumes". Each wash volume of permeate removed reduces the concentration of contaminants by a factor of "e" which equals 2.718. For example, a five-volume diafiltration will reduce the contaminant level by a factor of e to the 5th power, which is approximately 144 times. This represents over 99.3% reduction in contaminant concentration. In constant volume diafiltration, the five wash volumes of permeate are replaced by five wash volumes of exchange buffer.

Automatic diafiltration in this type of an arrangement for removal of undesirable electrolytes from biological liquids is now further exemplified in a constant pressure filtration application. A typical aqueous protein solution containing undesirable electrolytes and other low molecular weight contaminants can be successfully processed with high operational safety and with optimal filtration conditions. Typical parameters to be selected in this regard as follows: pump tubing, No. 18; filter pressure limit, 25 psi; permeate weight alarm limit, 10,000 grams set for pump stop; high pressure alarm limit, 25 psi set for pump stop; low flow alarm limit, 50 ml/min set for pump stop; run time alarm limit, 45 minutes set for off; and retentate volume alarm limit, 100 liters set for signal only. In this filtration application, the permeate (filtrate) weight, high and pressure parameters are the ones designated as critical for safe operation. Thus, the processor-controlled pump unit will stop when the permeate weight reaches 10,000 grams or when the back pressure exceeds 25 psi. The run time signal is turned off in this example, and the retentate volume alarm provides only a signal to the operator when the set volume is achieved.

To operate the filtration system of FIG. 2 in the constant volume diafiltration mode, a dilute protein solution 22a, for example 2.0 ml, is placed into the diafiltration container 21a. Both the permeate clamp 62 and the buffer clamp 63 are closed when the pump is started; a small volume of process solution is recirculated through the filtration device to expel any air from the system. At this point, the permeate clamp 62 as well as the buffer clamp 63 are opened, and the permeate is collected as an undesirable contaminant. Each volume of permeate is automatically replaced by an equal volume of exchange buffer from the container 61. This continues until, in this example, the operator-selected weight of permeate of 10 grams has been collected. It will be noted that a collected permeate volume of 10 ml would represent five wash volumes (that is 10 ml permeate per 2.0 ml initial process volume). This represents a 99.3% reduction of the contaminant concentration level.

Once the electrolyte exchange has been completed, the dilute protein solution is concentrated in a single step using an identical device as shown in FIG. 2. While the pump is running, the buffer clamp 63 is closed, and the air valve 64 of the diafiltration container 61 is opened. In this configuration, the buffer solution is collected as permeate while the diafiltration volume decreases by the same amount, thereby increasing the protein concentration. Typically, the system is stopped when the desired protein concentration level has been achieved.

EXAMPLE 1

This example illustrates removal of cell debris from *E-coli* lysate by microfiltration. A genetically engineered *Escherichia coli* culture was grown in a fermenter and then mechanically lysed. The *E-coli* lysate was processed or filtered to recover an intracellular protein.

The *E-coli* lysate was subjected to the following process conditions in a unit in accordance with FIG. 1 having data flow properties as illustrated in FIG. 4. The filtration unit was a single MiniKros® tangential flow membrane module (P/N:M22M-300-01N) of Microgon Inc. This filtration unit had a 2800 cm$^2$ membrane surface area and a 0.2 micron pore size. To this, two Tandem (P/N:080–108, Scilog Inc.) pump heads were mounted together in piggyback fashion. The combined output of both pump heads was approximately 4.5 liters per minute when used with the number 18 Masterflex® silicone tubing.

The parameters set for the constant rate filtration were as follows. The recirculation rate or pump rate was set at 4.0 liters per minute. The high pressure alarm limit was set at 11.5 psi, for alarm signal only. The filtrate weight alarm limit was set at 17,400 grams, being set for pump stop as well as alarm signal. The system included a Sartorius BP 34 electronic balance, and a 25 liter container was placed onto the balance for filtrate collection.

The initial process volume was 18 liters of lysate. The permeate port was closed until retentate circulation was well established. The initial filter inlet pressure was 10 psi, which remained constant throughout 80% of the microfiltration run. During most of the filtration process, the filter inlet pressure did not exceed 10 psi. In the later stages of the filtration process, the inlet pressure rose to 12.5 psi due to increased concentration and/or viscosity of the retentate. Based upon previous experience, a 30-fold reduction in retentate volume was expected. Approximately 45 minutes into the filtration run, the high pressure alarm was triggered indicating an increase in retentate viscosity, which signalled the final phase of the filtration process. The processor-controlled pump unit automatically stopped after 17,400 grams (17.4 liters, a 30-fold reduction in retentate volume) of purified filtrate was collected. The filtration process took 55 minutes.

This was carried out in an automated and unattended manner. The microfiltration process was automatically stopped once the preset filtrate weight limit was reached. The final and often critical phase of the filtration process was indicated by the high pressure alarm which alerted the operator and prepared the operator for completion of the filtration process.

EXAMPLE 2

Diafiltration was used to purify diagnostic microparticles. As background, many commercially available diagnostic testing kits are based on a technology by which reagent molecules (for example albumin, IgG, IgM, antibodies, antigens or other ligands) are immobilized onto submicron latex particles. This technique is referred to as latex agglutination and requires that the latex particles be cleaned before and after the protein has been attached to the particle surface. After completion of the protein immobilization step, excess free protein must be removed to insure reliable agglutination. Because of the high cost of both the agglutination reagents and the final product, concerns regarding product recovery, process safety as well as labor costs are of utmost importance. Reagent and/or product spills resulting from either filter plug-up conditions or pump tube wear and the like are very costly and must be avoided. This example answers these concerns.

Free protein was removed from latex particles utilizing a system as in FIG. 2 having a data channel flow as illustrated in FIG. 5, that is under the constant pressure filtration mode. Number 18 pump tubing was used, and the processor-controlled pump unit was set in accordance therewith. A pump pressure alarm limit was set at 8 psi. A low flow alarm limit was set at 200 ml/min. Each alarm limit was set for signalling only. A filtrate weight alarm limit of 1500 grams was set for both signalling and stopping functions. The electronic balance was a Mettler PM 6000, and a container with 2.3 liters of buffer was placed onto this balance.

The initial process volume of 150 ml consisted of 15 ml of 10% 0.250 micron diameter polystyrene uniform latex particles (Seradyn) with 2.5% bovine serum albumin (BSA) absorbed in the presence of 50 mM tris buffer. A 0.1 micron rated Xampler laboratory cartridge available from A/G Technology (P/N:CFP-1-E-4A) was used as the filter unit. This filter unit had 430 cm$^2$ of membrane surface. The filter inlet pressure of 8 psi remained constant throughout the diafiltration run. The particle solution was recirculated at approximately 2.0 liters per minute, and the filtrate port was open throughout the run. A buffer solution consisting of 50 mM tris buffer was added continuously to the diafiltration reservoir at the same rate that filtrate was removed. By this procedure, a constant 150 ml processing volume was maintained in the diafiltration container. 1500 ml of buffer solution (10 wash volumes) were added over a 20 minute time interval. During the diafiltration run, the system maintained a safe, 8 psi filter back pressure, while at the same time an average pump rate of 2.0 liters per minute was measured. The system automatically stopped when 1500 grams (10 wash volumes) of filtrate were collected. The removal of free BSA was rapid (taking only 20 minutes) and exceeded 99.95%. No latex particles were detested in the filtrate, and there was no detectable loss of absorbed BSA. The filtrate remained constant throughout the diafiltration run.

This procedure was carried out as an automated and unattended operation of the diafiltration process. This was done without concern of exceeding the safe, 8 psi back pressure limit and without loss of product due to system failure.

It will be understood that the embodiments of the present invention which have been described are illustrative of some of the applications of the principles of the present invention. Various modifications may be made by those skilled in the art without departing from the true spirit and scope of the invention.

I claim:

1. An apparatus for automated, quantitative filtration of liquids, comprising:

a reservoir for containing a liquid, the liquid containing filterable material dissolved or suspended within a carrier liquid;

a filtration unit having an inlet, a filtrate outlet and a retentate outlet, said filtration unit receives the liquid to be filtered through the inlet and separates at least some of the filterable material therefrom which passes as filtrate through said filtrate outlet, and a retentate of the carrier liquid and residue filterable material passes from the retentate outlet;

a conduit system which directs the liquid to be filtered from said reservoir to said inlet of the filtration unit and from the retentate outlet for return passage to said reservoir;

at least one pressure sensor positioned along said conduit system for monitoring pressure within said conduit system;

a processor-controlled pump unit which controls movement rate of the liquid through the filtration unit, said processor-controlled pump unit having control data channel circuitry which receives and operates upon data from said pressure sensor to control flow of the liquid through said filtration unit, said control data channel circuitry further including limit setting data channel circuitry to set parameter limits for controlling at least one filtration parameter; and said conduit system includes tubing of a selected size, and said limit setting data channel circuitry receives a user-input indication of said selected size of the tubing.

2. The apparatus according to claim 1, wherein said processor-controlled pump unit includes a peristaltic pump which receives a portion of the conduit system and progresses the liquid therethrough.

3. The apparatus in accordance with claim 2, wherein said peristaltic pump has more than one track which receives said portion of the conduit system.

4. The apparatus in accordance with claim 1, further including a unit which detects the amount of filtrate which passes through the filtrate outlet, and said control data channel circuitry receives filtrate amount data from said unit and signals that a filtrate amount limit of said limit setting data channel circuitry has been attained.

5. The apparatus in accordance with claim 4, wherein said control data channel circuitry initiates a user-recognizable signal that the filtrate amount limit has been collected.

6. The apparatus in accordance with claim 4, wherein said control data channel circuitry initiates stopping of said processor-controlled pump unit in response to said filtrate amount limit being attained.

7. The apparatus in accordance with claim 1, wherein said data channel circuitry includes stopping data channel circuitry which directs ceasing of movement of the liquid by the processor-controlled pump unit.

8. The apparatus in accordance with claim 1, wherein the control data channel circuitry of the processor-controlled pump controls the rate of flow of the liquid moved by the processor-controlled pump unit, said rate being substantially constant once attained.

9. The apparatus in accordance with claim 1, wherein said control data channel circuitry of the processor-controlled pump unit utilizes said data from the pressure sensor to control the flow rate of the liquid through the processor-controlled pump unit and to maintain the pressure at said pressure sensor at a substantially constant pressure.

10. The apparatus in accordance with claim 1, wherein said limit setting data channel circuitry receives a user-input limit for cumulative volume of retentate cycled through the filtration unit.

11. The apparatus in accordance with claim 10, wherein said control data channel circuitry monitors retentate cumulative volume and signals that the limit for cumulative volume of retentate has been attained.

12. The apparatus in accordance with claim 11, wherein said control data channel circuitry initiates a user-recognizable signal that the limit for cumulative volume of retentate has cycled.

13. The apparatus in accordance with claim 11, wherein said control data channel circuitry initiates stopping of said processor-controlled pump unit in response to said cumulative volume of retentate having been cycled.

14. The apparatus in accordance with claim 1, wherein said limit setting data channel circuitry receives a user-input limit for pump unit run time, and said control data channel circuitry monitors pump unit run time and signals that the limit for pump unit run time has been attained.

15. The apparatus in accordance with claim 14, wherein said control data channel circuitry initiates a user-recognizable signal that the limit for pump unit run time has been attained.

16. The apparatus in accordance with claim 14, wherein said control data channel circuitry initiates stopping of said processor-controlled pump unit in response to said limit for pump unit run time having been attained.

17. The apparatus in accordance with claim 1, wherein said limit setting data channel circuitry receives a user-input limit for low pressure data from said pressure sensor, and said control data channel circuitry monitors said low pressure data and signals that the limit for low pressure has been attained.

18. The apparatus in accordance with claim 17, wherein said control data channel circuitry initiates a user-recognizable signal that the limit for low pressure has been attained.

19. The apparatus in accordance with claim 17, wherein said control data channel circuitry initiates stopping of said processor-controlled pump unit in response to said limit for low pressure having been attained.

20. The apparatus in accordance with claim 1, wherein said limit setting data channel circuitry receives a user-input limit for high pressure data from said pressure sensor, and said control data channel circuitry monitors said high pressure data and signals that the limit for high pressure has been attained.

21. The apparatus in accordance with claim 20, wherein said control data channel circuitry initiates a user-recognizable signal that the limit for high pressure has been attained.

22. The apparatus in accordance with claim 20, wherein said control data channel circuitry initiates stopping of said processor-controlled pump unit in response to said limit for high pressure having been attained.

23. The apparatus in accordance with claim 1, further including a diafiltration container located along said conduit system at a location downstream of said filtration unit, and an exchange liquid flows into the conduit system upstream of the filtration unit and provides a plurality of wash volumes which exchange with like volumes of permeate.

24. The apparatus in accordance with claim 1, wherein said at least one pressure sensor is positioned along said conduit system at a location between said processor-controlled pump and said inlet of the filtration unit.

25. The apparatus in accordance with claim 24, wherein another pressure sensor is positioned along said conduit system at a location downstream of said retentate outlet.

26. The apparatus in accordance with claim 25, wherein a further pressure sensor is positioned along said conduit system at a location downstream of said filtrate outlet.

27. The apparatus in accordance with claim 24, wherein a further pressure sensor is positioned along said conduit system at a location downstream of said filtrate outlet.

28. The apparatus according to claim 1, wherein said at least one pressure sensor monitors resistance to liquid flow within said filtration unit.

29. The apparatus according to claim 28, wherein said resistance to liquid flow which is monitored is trans-membrane pressure within said filtration unit, and wherein said control data circuitry maintains the trans-membrane pressure constant by adjusting the flow rate of the liquid through the filtration unit.

30. An apparatus for automated, quantitative filtration of liquids, comprising:
 a reservoir for containing a liquid, the liquid containing filterable material dissolved or suspended within a carrier liquid;
 a filtration unit having an inlet, a filtrate outlet and a retentate outlet, said filtration unit receives the liquid to be filtered through the inlet and separates at least some of the filterable material therefrom which passes as filtrate through said filtrate outlet, and a retentate of the carrier liquid and residue filterable material passes from the retentate outlet;
 a conduit system which directs the liquid to be filtered from said reservoir to said inlet of the filtration unit and from the retentate outlet for return passage to said reservoir;
 at least one pressure sensor positioned along said conduit system for monitoring pressure within said conduit system;
 a processor-controlled pump unit which controls movement rate of the liquid through the filtration unit, said processor-controlled pump unit having control data channel circuitry which receives and operates upon data from said pressure sensor to control flow of the liquid through said filtration unit, said control data channel circuitry further responds to a maximum pressure limit on pressure at said pressure sensor in order to control the flow rate of the liquid through the processor-controlled pump unit and to thereby maintain the pressure of said liquid at said filtration unit at a substantially constant pressure; and
 wherein said conduit system includes tubing of a selected size, and said limit setting data channel circuitry receives a user-input indication of said selected size of the tubing.

31. The apparatus in accordance with claim 30, further including a scale which determines the weight of the filtrate which passes through the filtrate outlet, and said control data channel circuitry receives said weight of the filtrate and signals that a filtrate weight limit has been attained.

32. The apparatus in accordance with claim 31, wherein said control data channel circuitry initiates a user-recognizable signal that the filtrate weight limit has been attained.

33. The apparatus in accordance with claim 31, wherein said control data channel circuitry initiates stopping of said processor-controlled pump unit in response to said filtrate weight limit having been attained.

34. The apparatus in accordance with claim 30, wherein said control data channel circuitry monitors retentate cumulative volume cycled through the filtration unit and signals that a limit for cumulative volume of retentate has been attained.

35. The apparatus in accordance with claim 30, wherein said control data channel circuitry receives a user-input limit for pump unit run time, and said control data channel circuitry monitors pump unit run time and signals that the limit for pump unit run time has been attained.

36. The apparatus in accordance with claim 30, wherein said control data channel circuitry receives a user-input limit for low pressure data from said pressure sensor, and said control data channel circuitry monitors said low pressure data and signals that the limit for low pressure has been attained.

37. The apparatus in accordance with claim 30, wherein said control data channel circuitry includes a calibration look-up table which relates a pump unit speed of rotation parameter with a pump unit output in terms of volume per unit time.

38. The apparatus in accordance with claim 30, further including a diafiltration container located along said conduit system at a location downstream of said filtration unit, said diafiltration container having an exchange liquid which replaces a volume of retentate flowing from and retentate outlet of the filtration unit and into said diafiltration container.

39. The apparatus according to claim 30, wherein said at least one pressure sensor monitors resistance to liquid flow within said filtration unit.

40. The apparatus according to claim 39, wherein said resistance to liquid flow which is monitored is trans-membrane pressure within said filtration unit, and wherein said control data circuitry maintains the trans-membrane pressure constant by adjusting the flow rate of the liquid through the filtration unit.

41. An apparatus for automated, quantitative filtration of liquids, comprising:
 a reservoir for containing a liquid, the liquid containing filterable material dissolved or suspended within a carrier liquid;
 a filtration unit having an inlet, a filtrate outlet and a retentate outlet, said filtration unit receives the liquid to be filtered through the inlet and separates at least some of the filterable material therefrom which passes as filtrate through said filtrate outlet, and a retentate of the carrier liquid and residue filterable material passes from the retentate outlet;
 a conduit system which directs the liquid to be filtered from said reservoir to said inlet of the filtration unit and from the retentate outlet for return passage to said reservoir;
 at least one pressure sensor positioned along said conduit system for monitoring pressure within said conduit system;
 a processor-controlled pump unit which controls movement rate of the liquid through the filtration unit, said processor-controlled pump unit having control data channel circuitry which receives and operates upon data from said pressure sensor to control flow of the liquid through said filtration unit, said control data channel circuitry further including limit setting data channel circuitry to set parameter limits for controlling at least one filtration parameter;

said conduit system includes tubing of a selected size, and said limit setting data channel circuitry receives a user-input indication of said selected size of the tubing; and said control data channel circuitry includes a calibration look-up table which relates a pump unit speed of rotation parameter with a pump unit output in terms of volume per unit time.

42. The apparatus according to claim 41, wherein said at least one pressure sensor monitors resistance to liquid flow within said filtration unit.

43. The apparatus according to claim 42, wherein said resistance to liquid flow which is monitored is trans-membrane pressure within said filtration unit, and wherein said control data circuitry maintains the trans-membrane pressure constant by adjusting the flow rate of the liquid through the filtration unit.

44. An apparatus for automated, quantitative filtration of liquids, comprising:

a reservoir for containing a liquid, the liquid containing filterable material dissolved or suspended within a carrier liquid;

a filtration unit having an inlet, a filtrate outlet and a retentate outlet, said filtration unit receives the liquid to be filtered through the inlet and separates at least same of the filterable material therefrom which passes as filtrate through said filtrate outlet, and a retentate of the carrier liquid and residue filterable material passes from the retentate outlet;

a conduit system which directs the liquid to be filtered from said reservoir to said inlet of the filtration unit and from the retentate outlet for return passage to said reservoir;

at least one pressure sensor positioned along said conduit system for monitoring pressure within said conduit system;

a processor-controlled pump unit which controls movement rate of the liquid through the filtration unit, said processor-controlled pump unit having control data channel circuitry which receives and operates upon data from said pressure sensor to control flow of the liquid through said filtration unit, said control data channel circuitry further responds to a maximum pressure limit on pressure at said pressure sensor in order to control the flow rate of the liquid through the processor-controlled pump unit and to thereby maintain the pressure of said liquid at said filtration unit at a substantially constant pressure; said conduit system includes tubing of a selected size, and said limit setting data channel circuitry receives a user-input indication of said selected size of the tubing; and said control data channel circuitry includes a calibration look-up table which relates a pump unit speed of rotation parameter with a pump unit output in terms of volume per unit time.

45. An apparatus for automated, quantitative filtration of liquids, comprising:

a reservoir for containing a liquid, the liquid containing filterable material dissolved or suspended within a carrier liquid;

a filtration unit having an inlet, a filtrate outlet and a retentate outlet, said filtration unit receives the liquid to be filtered through the inlet and separates at least some of the filterable material therefrom which passes as filtrate through said filtrate outlet, and a retentate of the carrier liquid and residue filterable material passes from the retentate outlet;

a conduit system which directs the liquid to be filtered from said reservoir to said inlet of the filtration unit and from the retentate outlet for return passage to said reservoir;

at least one pressure sensor positioned along said conduit system for monitoring pressure within said conduit system;

a processor-controlled pump unit which controls movement rate of the liquid through the filtration unit, said processor-controlled pump unit having control data channel circuitry which receives and operates upon data from said pressure sensor to control flow of the liquid through said filtration unit, said control data channel circuitry further responds to a maximum pressure limit on pressure at said pressure sensor in order to control the flow rate of the liquid through the processor-controlled pump unit and to thereby maintain the pressure of said liquid at said filtration unit at a substantially constant pressure; said conduit system includes tubing of a selected size, and said limit setting data channel circuitry receives a user-input indication of said selected size of the tubing; and said at least one pressure sensor monitors resistance to liquid flow within said filtration unit and said resistance to liquid flow which is monitored is trans-membrane pressure within said filtration unit, and wherein said control data circuitry maintains the trans-membrane pressure constant by adjusting the flow rate of the liquid through the filtration unit.

* * * * *

UNITED STATES PATENT AND TRADEMARK OFFICE
CERTIFICATE OF CORRECTION

PATENT NO : 5,947,689
DATED : September 7, 1999
INVENTOR(S) : Karl G. Schick

It is certified that error appears in the above-identified patent and that said Letters Patent are hereby corrected as shown below:

In the drawings, on Sheet 4 of 6, delete "4/6";
Col. 4, line 9, delete "31" and insert --32--;
Col. 7, line 9, delete "sped" and insert --speed--;
Col. 8, line 13, delete "=0" and insert --= 0--;
Col. 12, line 64, delete "detested" and insert --detected--;
Col. 17, line 33, delete "same" and insert --some--.

Signed and Sealed this

Tenth Day of April, 2001

NICHOLAS P. GODICI

*Attest:*

*Attesting Officer*  *Acting Director of the United States Patent and Trademark Office*